INVENTOR
C. D. McCULLOUGH
By J. J. Lipari
ATTORNEY

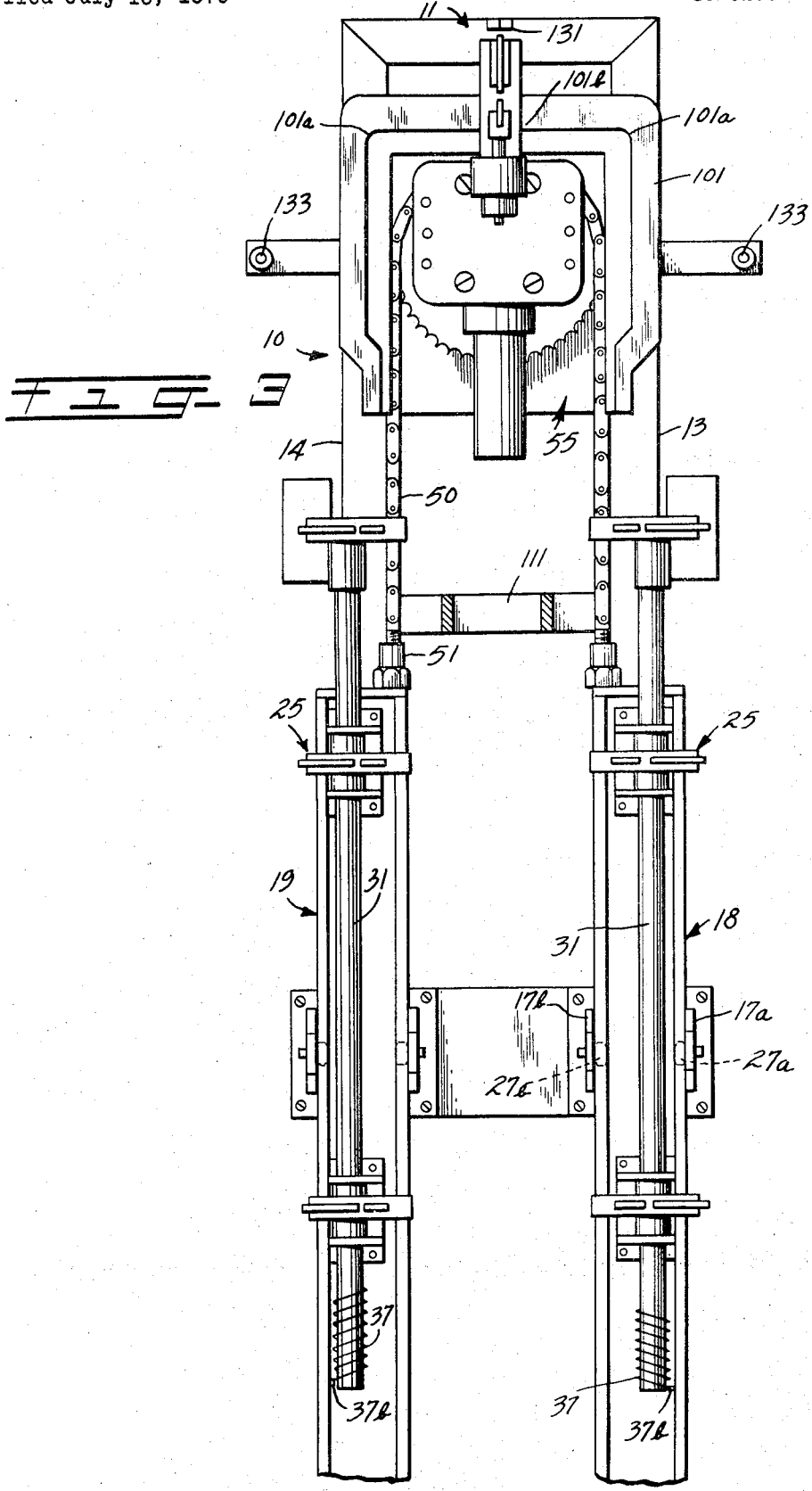

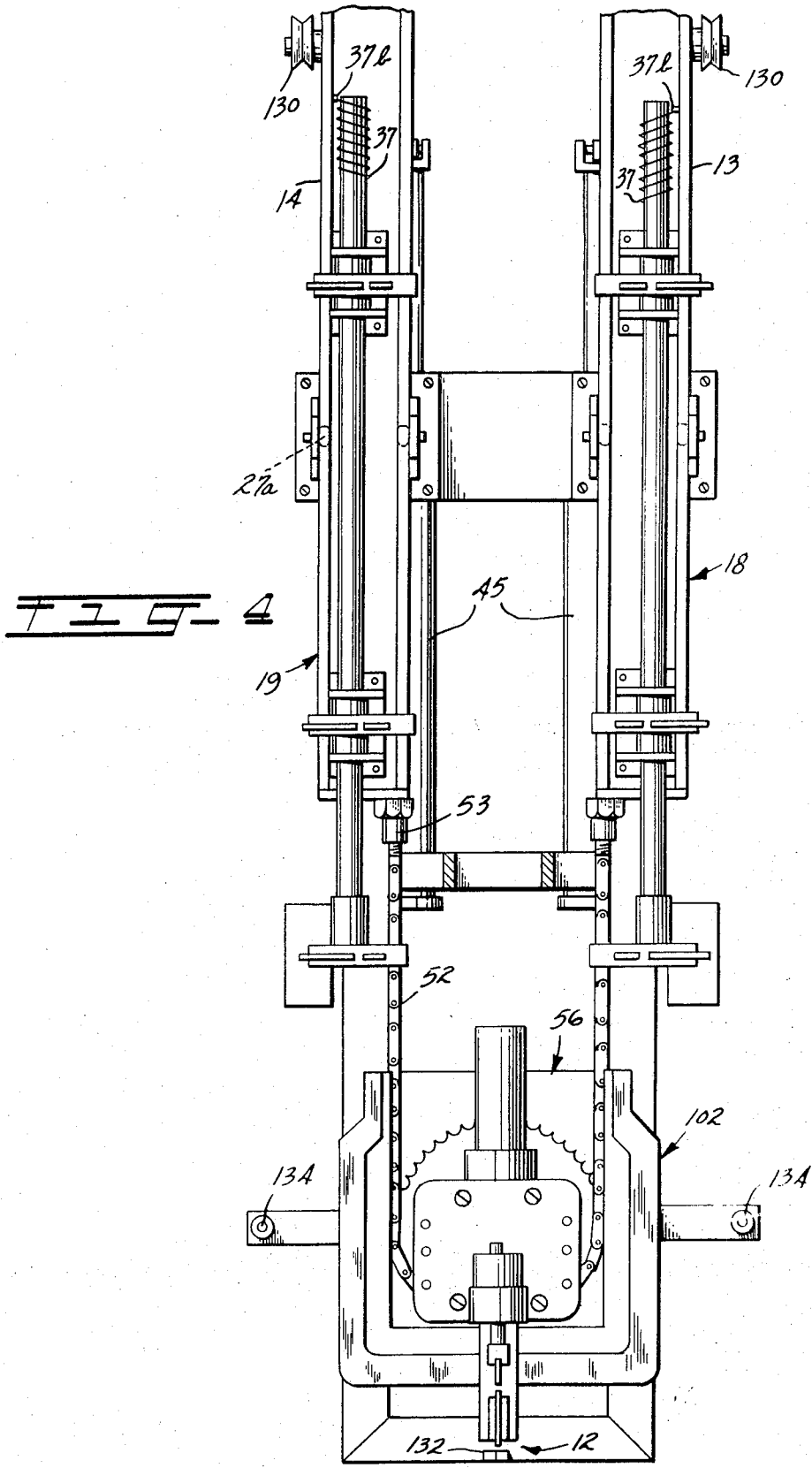

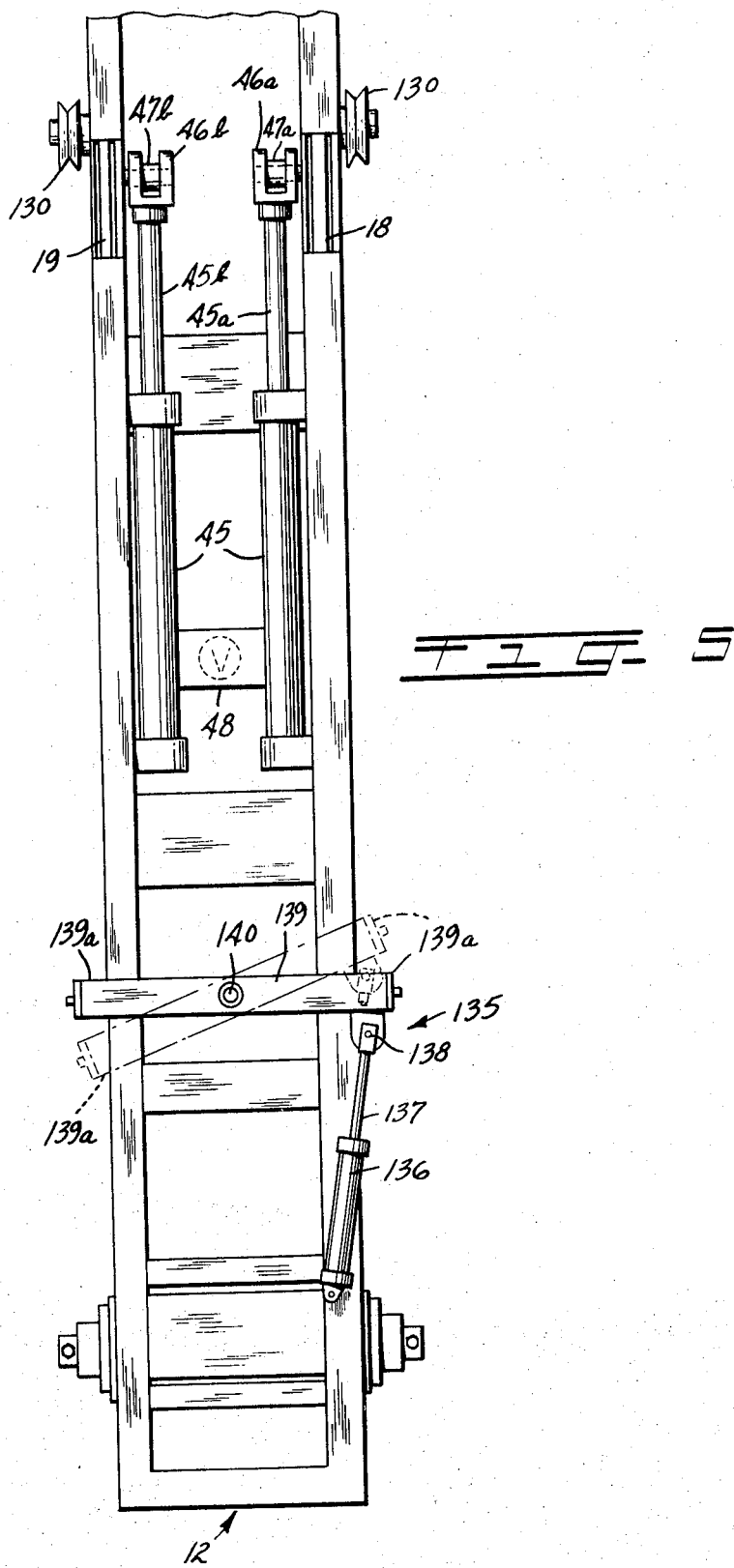

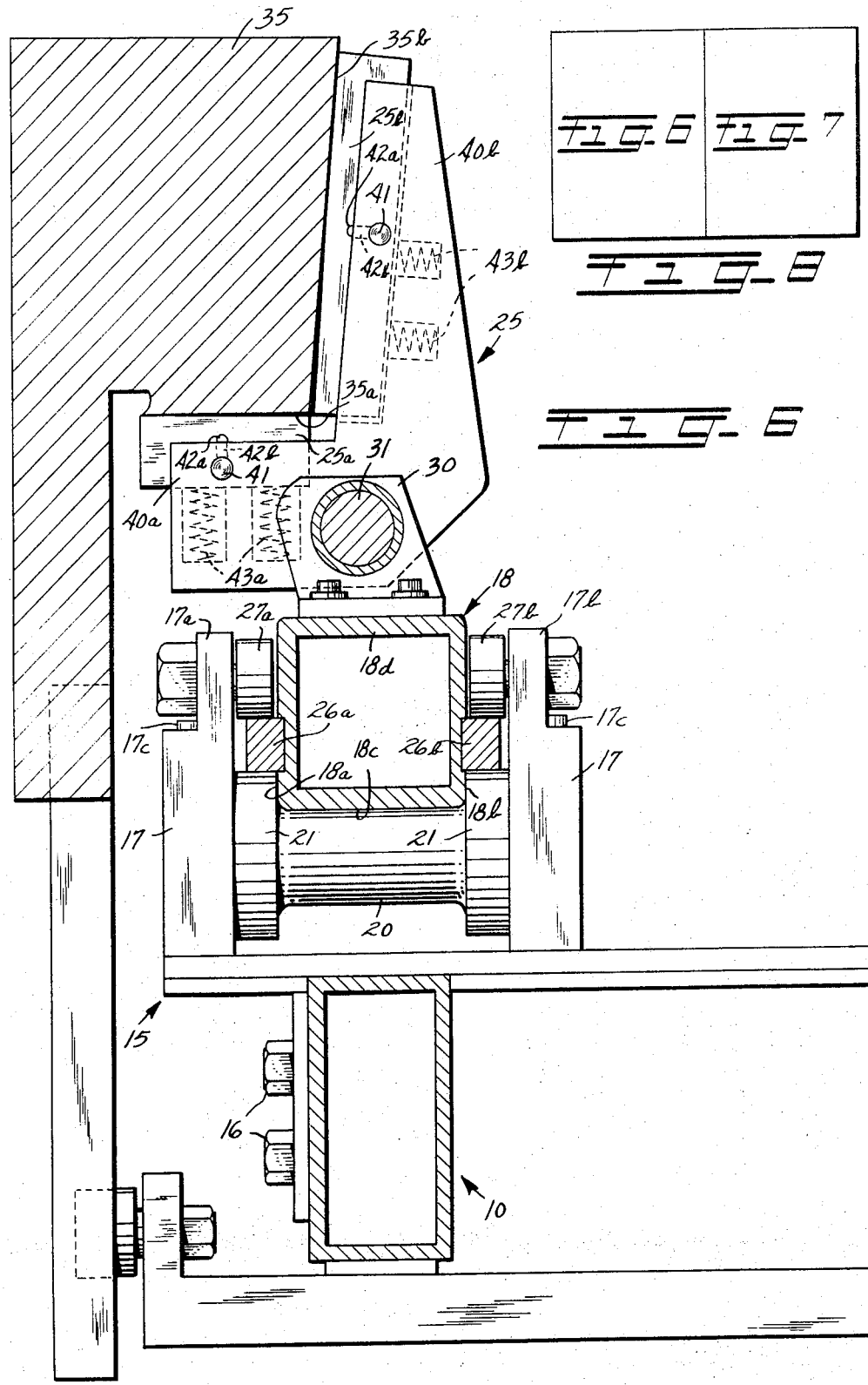

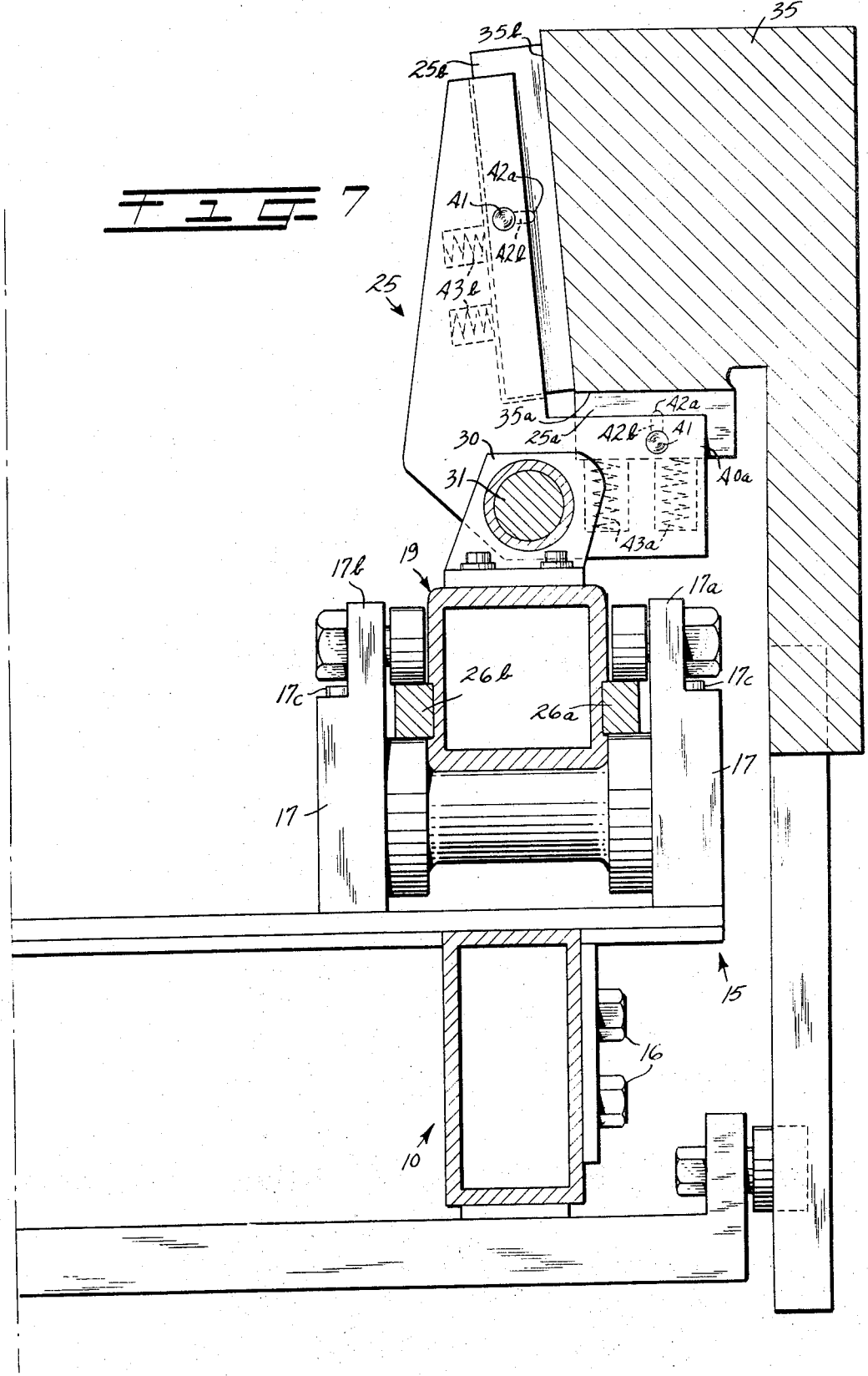

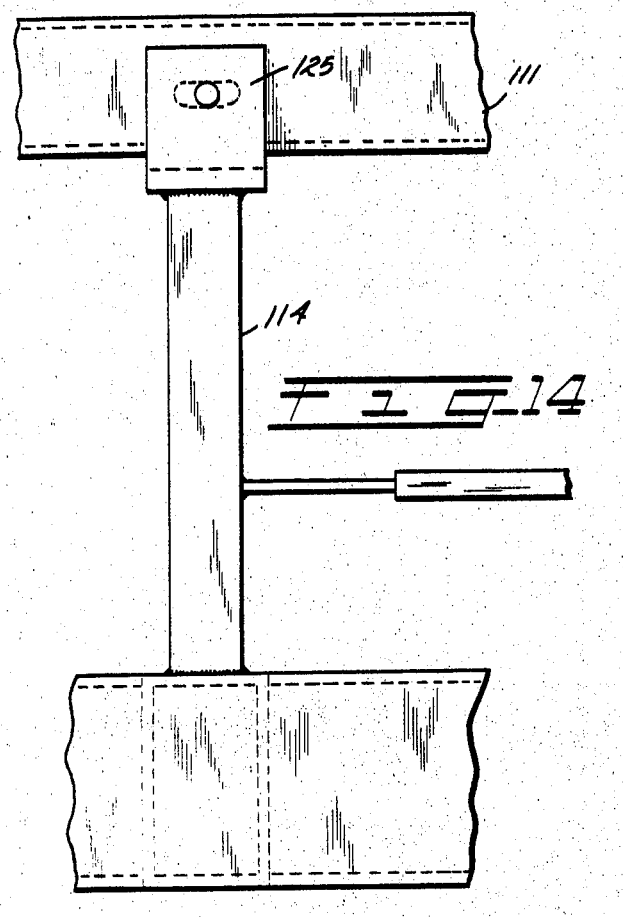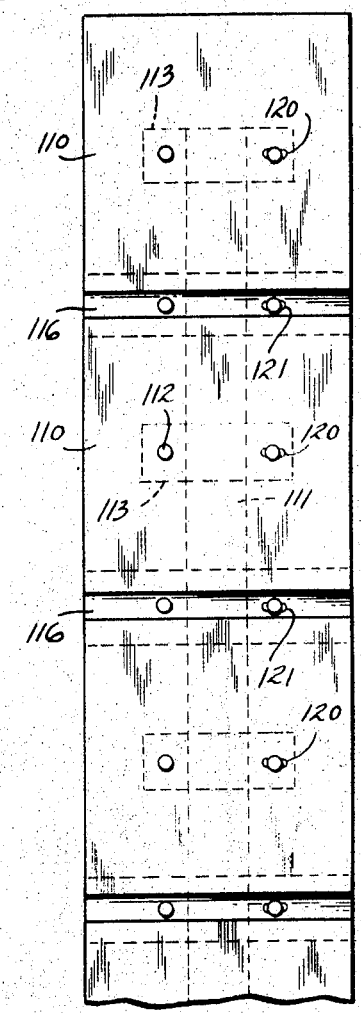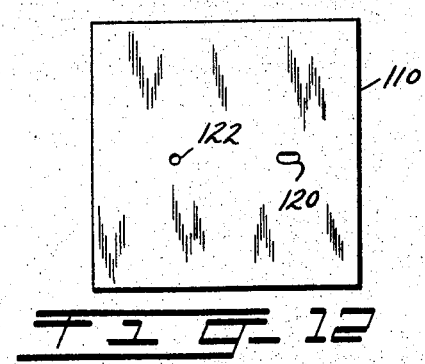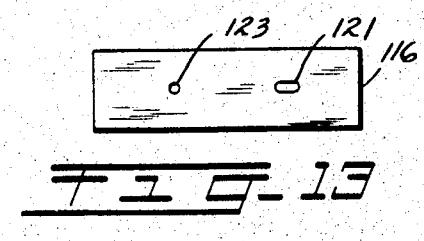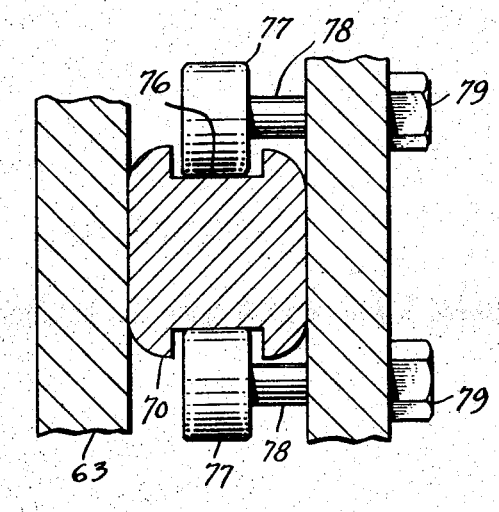

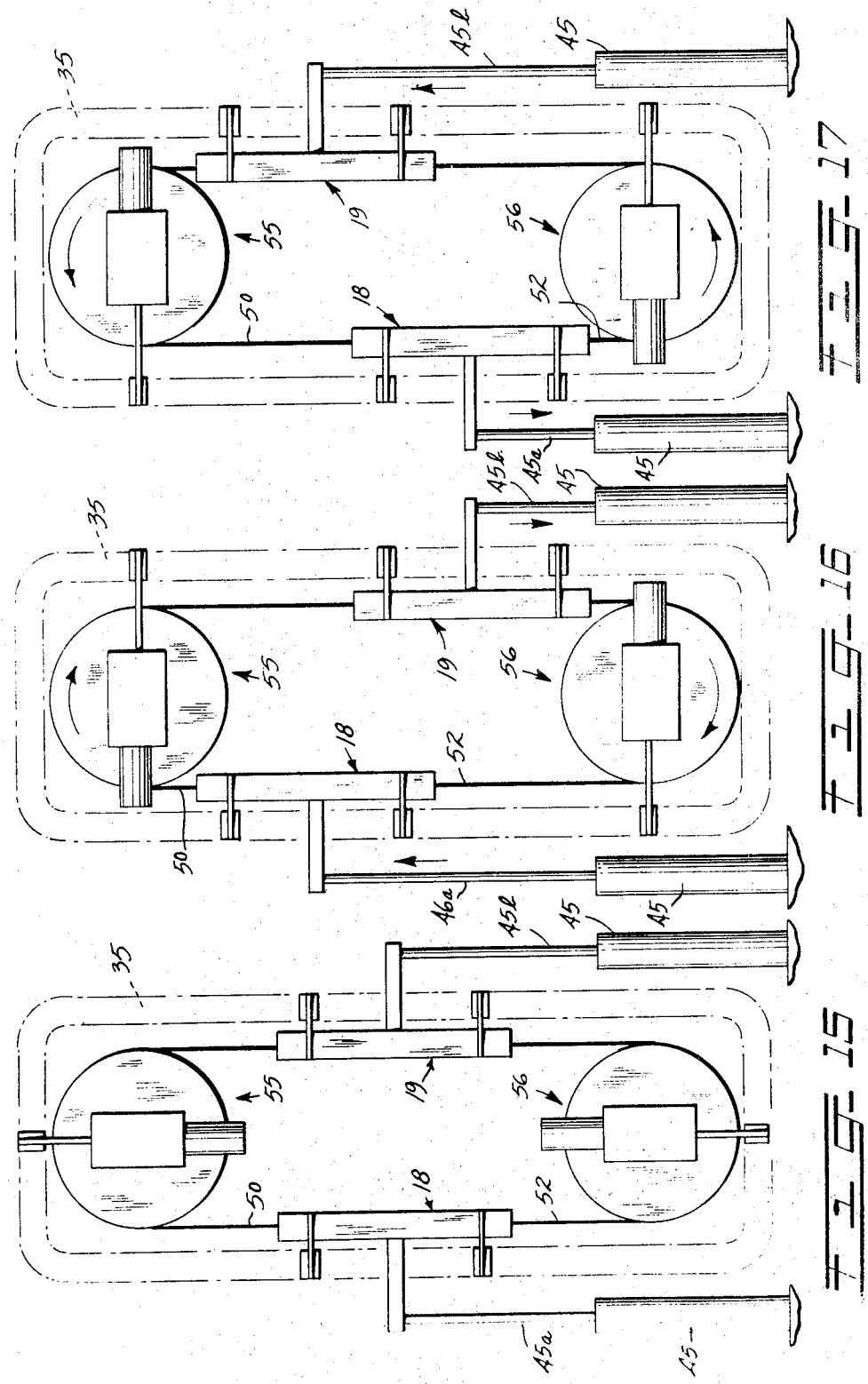

United States Patent Office 3,681,201
Patented Aug. 1, 1972

3,681,201
LINEAR RECIPROCATING SCRAPING MECHANISMS FOR COKE OVEN JAMBS
Charles D. McCullough, Metropolis, Ill., assignor to Wilputte Corporation, New Providence, N.J.
Filed July 15, 1970, Ser. No. 55,126
Int. Cl. C10b 43/04
U.S. Cl. 202—241
9 Claims

ABSTRACT OF THE DISCLOSURE

In apparatus for mechanically scraping formed deposits from the jamb of a coke oven, a linear reciprocating movable scraping mechanism for scraping deposits from substantially right angular surfaces of the side walls of a coke oven jamb. The mechanism includes a frame, a pair of carriages cooperatively associated with the frame and extending longitudinally in parallel relationship to each other, and holding means connected to each carriage. At least one scraper unit is connected to each holding means, said scraper units capable of scraping said side walls of the jamb. Means are provided for driving, guiding and maintaining the carriages in opposing reciprocating linear paths, the scrapers on the carriages scraping said deposits in their respective paths.

BACKGROUND OF THE INVENTION

Self-sealing doors for coke ovens have a sealing strip extending therearound which presents a knife edge to the machined face of the door jamb for sealing therewith. It is well known that, in order to be effective, the seal made between a self sealing coke oven door and its jamb must be gas tight and therefore depends upon the sealing surfaces therebetween being initially clean. Thus, due to the formation of deposits of a pitchy, carbonaceous nature along the sealing strip surface and jamb during the coking operation, it is necessary to periodically clean these surfaces, preferably after each coking operation.

Coke oven jamb cleaning has in the past generally been performed manually by scraping and chipping the deposits from the sealing surfaces. The cleaning performed in this manner is tedious and arduous work which is not efficiently performed because of the prevailing heat conditions in the vicinity of the coke oven door jambs. Further, such cleaning results in uneconomically long shut-down of the coke ovens between charges and, additionally, the equipment used in scraping and chipping often mars the sealing jamb surfaces.

Various proposals have been made in the past for mechanically effecting the cleaning of the sealing surfaces of the coke oven jamb, such as the use of mechanical scrapers. Such apparatus have not proved satisfactory due to wear characteristics on the sealing surfaces and their inability to meet self-cleaning requirements. Further, such scrapers were inefficient for scraping the side walls of the jamb.

SUMMARY OF THE INVENTION

It is therefore an object of the present invention to provide an improved scraper mechanism in a jamb cleaner for scraping the side walls of a coke oven jamb.

Broadly, the invention is concerned with a linear reciprocating movable scraping mechanism for scraping formed deposits from substantially right angular surfaces of the side walls of a coke oven jamb. The mechanism includes a frame, a pair of carriages cooperatively associated with the frame and extending longitudinally in parallel relationship to each other, and holding means connected to each carriage. At least one scraper unit is connected to each holding means, said scraper units capable of scraping said side walls of the jamb. Means are provided for driving, guiding and maintaining the carriages in opposing reciprocating linear paths, the scrapers on the carriages scraping said deposits in their respective paths.

BRIEF DESCRIPTION OF THE DRAWINGS

Other objects and a fuller understanding of the invention may be had by referring to the drawings in which:

FIG. 3 is a front view of the top half portion of the jamb cleaner;

FIG. 4 is a front view of the bottom half of the jamb cleaner;

FIG. 5 is a rear view of the bottom half portion of the jamb cleaner depicting the latching mechanism and carriage drive means;

FIG. 6, is a plan view of the left-hand side of the jamb cleaner depicting the carriage, and reciprocating linear scraper means in contact with the jamb;

FIG. 7, is plan view of the right hand side of the jamb cleaner depicting the carriage, and reciprocating linear scraper means in contact with the jamb;

FIG. 8 depicts the relationship of FIGS. 6 and 7, respectively;

FIG. 10 is a view taken along the line 10—10 of FIG. 9;

FIG. 11 is a front view of the primary and secondary heat-resistant shield assemblage;

FIG. 12 is a front view of a primary heat-resistant shield;

FIG. 13 is a front view of a secondary heat-resistant shield;

FIG. 14 depicts a portion of the frame for holding the heat-resistant shields;

FIG. 15 schematically illustrates the jamb cleaner in a position whereat the oscillating and linear scraping mechanisms are midway between the top, bottom and side walls of the jamb during their scraping cycle;

FIG. 16 schematically illustrates the jamb cleaner whereat each of the oscillating and linear scraping mechanisms are at one end of their scraping cycle; and FIG. 17 schematically illustrates the jamb cleaner whereat each of the oscillating and linear scraping mechanisms are at the other end of their scraping cycle.

DESCRIPTION OF THE PREFERRED EMBODIMENT

Figure 1:
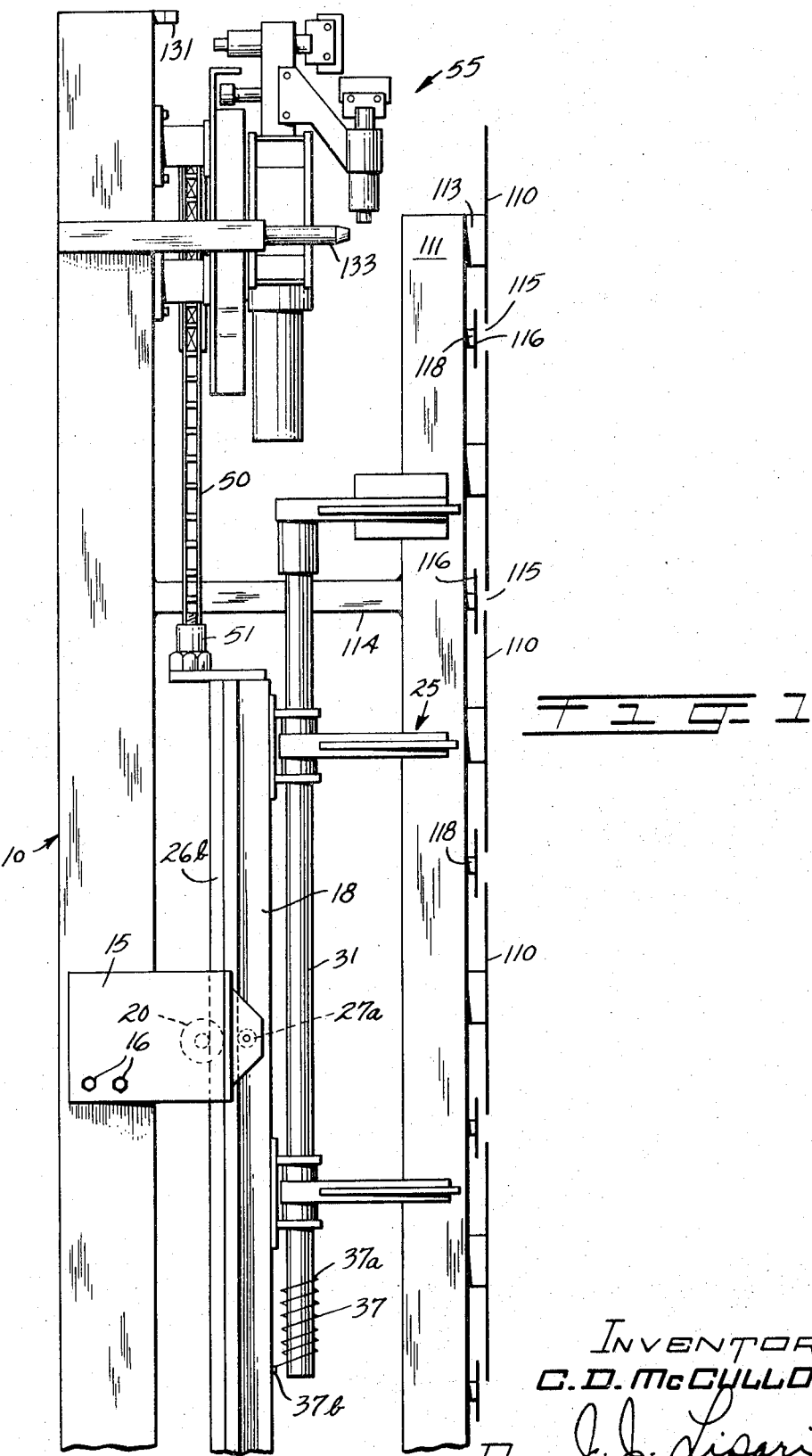
FIG. 1 is a side view of the top half portion of the jamb cleaner.
Figure 2:
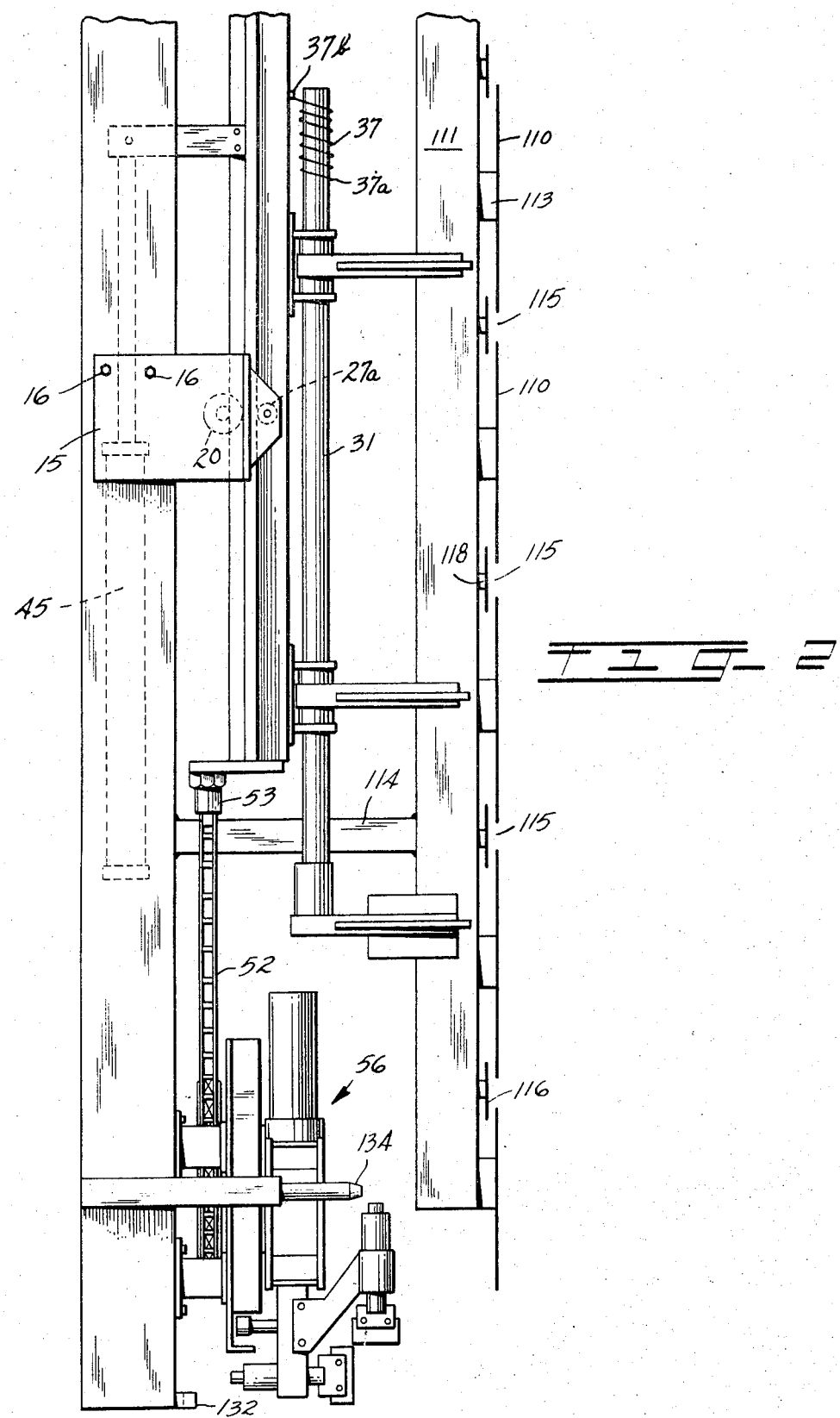
FIG. 2 is a side view of the bottom half portion of the jamb cleaner.

Referring more particularly to FIGS. 1–5 of the drawings, there is depicted a jamb cleaner of the instant invention which is capable of cleaning a jamb located at either the coke side or pusher side of the battery. The jamb cleaner may be mounted on a movable control apparatus (not shown) having associated therewith a door extracting means, a pusher machine, a door cleaner, etc. or any combination thereof.

The jamb cleaner includes a vertically extending main frame 10 of rectangular configuration having a top end 11, bottom end 12 and sides 13, 14. Each of the sides 13, 14 are provided with a plurality of brackets 15—15 mounted thereon by bolt means 16—16, each bracket having extending portions 17—17 (FIG. 6) projecting therefrom. A tube rail carriage 18 (FIGS. 3, 4 and 6) vertically extends along side 13 and, similarly, a tube rail carriage 19 vertically extends along side 14, each of said carriages being of substantially square cross-section and in parallel relationship to each other and main frame 10. The tube rail carriages 18, 19 are similar; thus, for the sake of simplicity, it is to be understood that a description of tube rail carriage 18 and its related components will suffice for a description of tube rail carriage 19 and its related components.

As seen in FIG. 6, the far ends of extending portions 17—17 project slightly beyond the walls 18a, 18b of tube rail carriage 18, and fixedly positioned between the rear ends of said extending portions 17—17 is a primary rotating guide roller 20 which is normally in contact with tube rail carriage wall 18c, said roller having flanged ends 21—21 which partially envelop rail carriage walls 18a, 18b. The roller functions to guide tube rail carriage 18 vertically during its linear reciprocating movement, and to exert a pressure on scraper blades 25—25, to be described more in detail hereinafter.

A pair of tracks 26a, 26b etxend along the entire length of tube rail carriage walls 18a, 18b, respectively. Secondary rollers 27a, 27b are mounted on respective extensions 17a, 17b, which are connected to extending portions 17—17 by conventional securing means 17c, 17c, said secondary rollers rotationally traveling over respective tracks 26a, 26b to positively insure that guide rail carriage 18 is normally positioned against primary roller 20.

A plurality of supports 30—30 are fixedly connected to tube rail carriage wall 18d at predetermined spaced intervals for supporting a plurality of shafts 31—31 (FIGS. 1-4) which extend in axial relationship to each other and in parallel relationship with tube rail carriage 18. A plurality of substantially L-shaped blade units, generally referred to at 25—25 (FIG. 6), are connected to shafts 31—31 at predetermined spaced intervals, each blade unit having a cutting edge 25a and a cutting edge 25b for scraping undesired carbon-tar substances formed on outer surface 35a and inner surface 35b, respectively, of jamb 35. Torsion springs 37—37 are coiled about shafts 31—31, each spring being connected at 37a to the shaft and at 37b to guide rail carriage 18 to hold the angle of the blade units in a first position such that each blade cutting edge 25a faces jamb surface 35a for initially striking said jamb surface when the jamb cleaner is moved by conventional means (not shown) into position with respect to the jamb. Continued forward movement of the jamb cleaner causes each blade cutting edge 25a to exert a force against outer jamb surface 35a and, in turn, cause shafts 31—31 to rotate, thereby resulting in each blade cutting edge 25b engaging jamb surface 35b, thus causing the blade units to assume a second position such that a full contact of each blade cutting edge 25a, 25b is made with its respective jamb surface 35a, 35b.

Each of blade cutting edges 25a, 25b, as seen in FIG. 6, is attached to blade holders 40a, 40b, respectively, by securing means 41—41, such as the bolt-nut type, which are connected through elongated slots 42a—42a and 42b—42b of each cutting edge and holder, respectively. With this arrangement the blades may be adjustably positioned for contact with the jamb. Further, the cutting edges 25a, 25b may be quickly and easily replaced, when worn or damaged, simply by disassembling the securing means 41—41 when the cleaner is in the retracted position.

A pair of springs 43a—43a and 43b—43b each are positioned within its respective holder to normally urge its blade cutting edge outwardly therefrom and provide sufficient tension through the blades against the jamb. Consequently, during a scraping operation, the cutting edges are enabled to scrape various irregular deposits of coal-tar substances formed on the jamb.

A pair of fluid operated cylinders 45—45 (FIGS. 2, 4 and 5) are mounted on the main frame and provided with respective pistons 45a, 45b whose ends 46a, 46b are connected by conventional fastening means 47a, 47b to guide rail carriages 18, 19, respectively. A conventional 4-way valve, generally referred to at 48, causes the cylinders to operate in an opposing reciprocating linear relationship when the cylinders are activated by means (not shown). Thus, when the jamb cleaner is in position with respect to the jamb for a scraping operation, as piston 45a extends it causes guide rail carriage 18 and, in turn, scraper blade units 25—25 associated therewith to move and scrape its respective jamb surfaces 35a, 35b in an upwardly direction. Simultaneously, piston 45b retracts and causes guide rail carriage 19 and, in turn, scraper blade units 25—25 associated therewith to move and scrape its respective jamb surfaces 35a, 35b in a downwardly direction. As a result the top right half portion and the bottom left half portion of the jamb is cleaned. After piston 45a is fully extended and piston 45b is fully retracted, valve 48 causes each piston to move in the opposite direction thereby resulting in carriage 18 moving downwardly and and carriage 19 moving upwardly causing the blade units thereon to clean the bottom right hand portion and top left hand portion of the jamb, respectively. The scraper blade units 25—25 are so spaced from each other and the extension of travel of each piston is such that each blade unit slightly overlaps the area of travel of a succeeding blade unit by approximately two to three inches to insure that the total surface area of the jamb's side surfaces are totally scraped.

After a scraping operation, further described in detail hereinafter, as the jamb cleaner retracts from the jamb, torsion springs 37—37 are caused to unwind to their normal rest position thus permitting shafts 31—31 to rotate in the opposite direction and, in turn, pivotally return and hold the blade units 25—25 in their normally inward first position with respect to the jamb.

As seen in FIGS. 1-4, a chain 50 interconnects the top ends of guide rail carriages 18, 19 by conventional attaching means 51—51 and, similarly, a chain 52 interconnects the bottom ends of said guide rail carriages by conventional attaching means 53—53, said chains respectively driving upper and lower oscillating head mechanisms 55, 56 (now to be described) for scraping the carbon-tar deposits located on the arcuate corners and top and bottom surfaces of the jamb.

Figure 9:
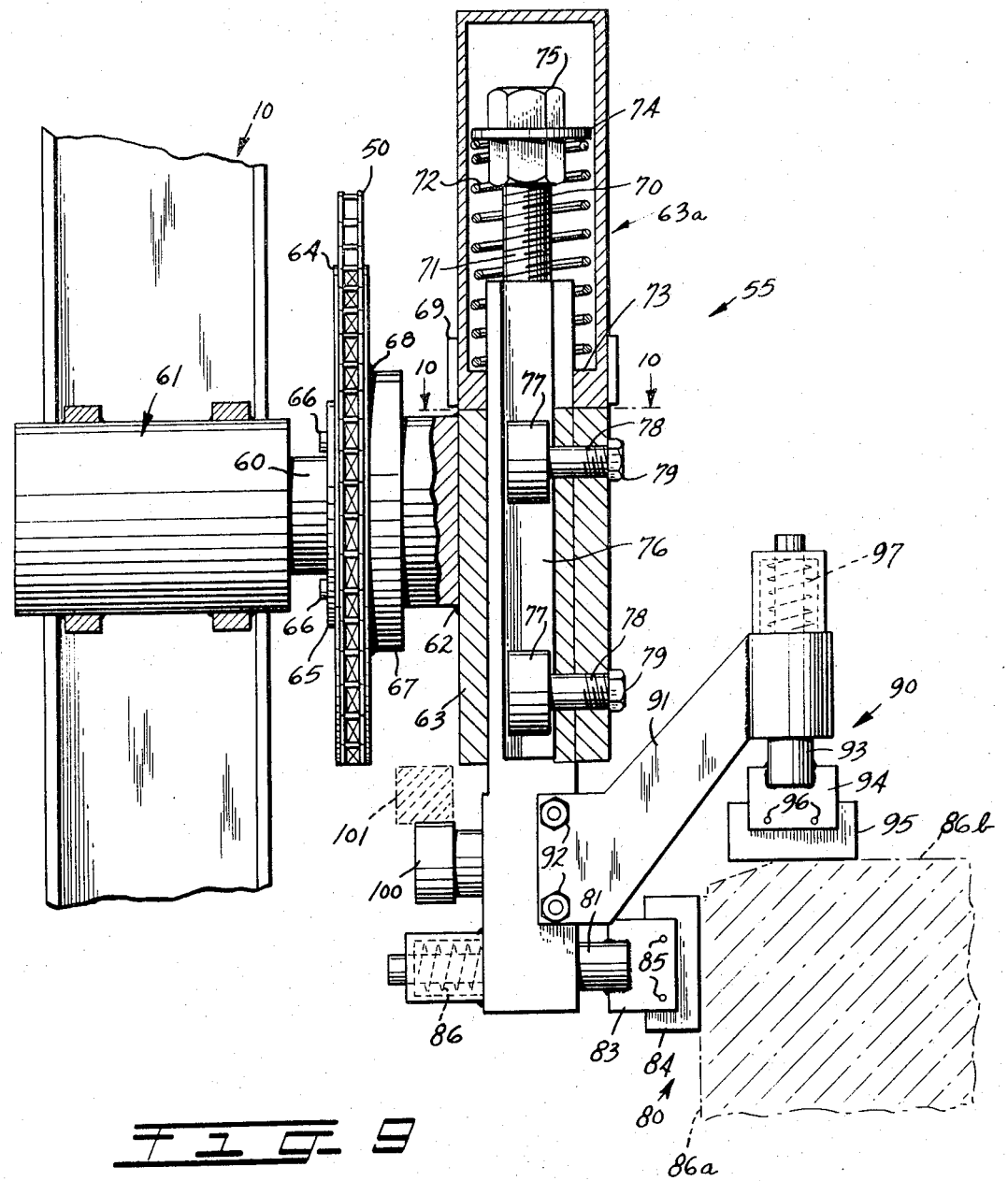
FIG. 9 is a partial cross-sectional view of the upper oscillating scraper mechanism.

As more particularly depicted in FIGS. 1, 3 and 9, oscillating head mechanisms 55 and 56 are substantially similar in structure and function; accordingly, the description of one will suffice for the other. The oscillating head mechanism (FIG. 9) includes a shaft 60 which is rotationally mounted at one end in main frame 10 by mounting means, generally referred to at 61, the other end of said shaft being welded at 62 to a housing 63. A sprocket 64, for driving chain 50, is connected about shaft 60 on one side by a fastener plate 65 and screws 66—66, and on the other side by a back-up ring 67 which is welded to the sprocket at 68.

Located within a housing 63a (FIG. 9), which is threadedly connected to housing 63 by coupling 69, is a rectangularly shaped shaft 70 having a threaded end 71 with a spring 72 coiled thereabout. One end of the spring is in contact with an internally disposed blocking surface 73 of the housing and the other end of the spring is in contact with a plate 74 associated with nut means 75 which are threadedly connected to end 71 for adjusting the desired tension on the shaft. Shaft 70 is provided with a pair of elongated recessed ways 76 (FIG. 10) located on opposing surfaces thereof, said ways being cooperatively associated with two pairs of cam rollers 77—77 having shafts 78—78 which are mounted to the housing by fastening means 79—79. It will be seen, as described in more detail hereinafter, that the cam rollers function to minimize lateral movement of shaft 70 as it reciprocates linearly during a scraping of the corners, top and bottom surfaces of the jamb.

Located at the far end of shaft 70 (FIG. 9) is a blade cutting unit, generally referred to at 80, which includes an arm 81 connected to shaft 70 and having a blade holder 83 for holding blade 84 which is removably connected thereto by fastening means 85—85. A spring 86 is coiled about arm 81 to insure and maintain the application of sufficient tension through blade 84 against outer jamb surface 86a for scraping various irregular deposits from the jamb surface.

Also located at the far end of shaft 70 is a blade cutting unit, generally referred to at 90, which includes a connecting member 91 attached to shaft 70 at 92—92 and having an arm 93 connected to blade holder 94 for holding blade 95 which is removably connected thereto by fastening means 96—96. A spring 97 is coiled about arm 93 to insure and maintain the application of sufficient tension through blade 95 against inner jamb surface 86b to permit the blade to scrape the various irregular deposits from the jamb surface.

Also located near the far end of shaft 70 is a cam roller 100 for following an inverted U-shaped cam track 101 (FIGS. 3 and 9) affixed to the top end of main frame 10 and having a configuration similar to but preferably smaller than the top and corner portions of the jamb. It is to be noted that while the U-shaped cam track 101 (FIG. 3) at the top of the frame is inverted, a similar U-shaped cam 102 (FIG. 4), located at the bottom end of the frame and cooperatively associated with oscillating head mechanism 56 is not inverted and has a configuration similar to but preferably smaller than the bottom and corner portions of the jamb.

As chain 50 is driven in response to the movement of carriages 18 and 19, roller 100 follows cam track 101 causing blades 84 and 95 to scrape the carbon-tar substances located in their paths as they travel from one top corner portion of the jamb and along its top surface to the other top corner portion thereof. As roller 100 travels towards and over the arcuate corner portions 101a (FIG. 3) of track 101, shaft 70 is moved linearly under spring tension within housing 63a to permit blade cutting units 80 and 90 to advance to the corresponding surface areas of the jamb and effectively scrape the carbon-tar substances therefrom. As roller 100 travels towards and over the mid-section 101b of the cam track, shaft 70 reciprocates linearly in the opposite direction to permit the blade cutting units to scrape the corresponding surface area of the jamb. During the linear reciprocating movement of shaft 70, lateral movement of the shaft is substantially prevented by cam rollers 77—77, previously described.

The aforesaid vital components of the jamb cleaner are protected against the intense heat emanating from the oven, when the jamb cleaner is in position for scraping the jamb, by a plurality of primary heat-resistant shields 110—110 (FIGS. 1, 2, 11, 12 and 13) which are successively vertically aligned and extend substantially the length of the cleaner. The primary shields 110—110 are constructed of a heat-resistant material, such as stainless steel or Inconel, and are connected to a vertically extending frame 111 by bolts 112—112 passing through supporting member 113, said vertically extending frame being connected to main frame 10 by brackets 114—114 The shields may be any desired configuration, preferably square or rectangular, and are of a width approximately equal to the width of the oven opening.

A gap or space 115—115, of about 1 inch or more, is provided between each successive shield 110 to provide a free area of movement for the shields as they expand due to their exposure to the intense heat of the oven, thereby preventing a warping or buckling of said shields. Secondary heat shields 116—116 (FIGS. 1 and 13), constructed of a material similar to the primary shields and preferably of rectangular configuration, are located in an area slightly behind the gaps 115—115 of the primary shields and are connected to frame 111 by bolts 117—117 passing through supporting members 118—118.

As seen in FIGS. 12 and 13, each of the primary and secondary heat shields are respectively provided with at least one elongated slot 120, 121 through which the bolts respectively pass for connecting the shields to frame 111. The bolts are not tightly fastened against the elongated slots in order to permit freedom of movement of the shields, via the elongated slots, during heat expansion thereof. In this manner buckling or warping of the shields are prevented. Each of the shields 110, 116 also are respectively provided with at least one relatively smaller diameter opening 122, 123 for receiving the bolts for securing the shields more tightly to frame 111. Finally, as seen in FIG. 14, supporting brackets 114 also are provided with elongated slots 125—125 for receiving bolts for securing the heat shield frame thereto, said slots providing the necessary area for movement of the frame in response to any heat expansion thereof.

In operation, the jamb cleaner is moved towards the oven opening by conventional moving means (not shown). As the jamb cleaner approaches the jamb, guide rollers 130—130 (FIG. 4) located near the mid-portion of the cleaner and projecting from sides 13 and 14 respectively, engage fixed guides (not shown) extending from the external surface of the oven wall. As rollers 130—130 ride over the guides, the jamb cleaner becomes vertically aligned with the jamb. A tapered alignment arm 131 (FIG. 1) located at the top of the cleaner engages a complementary V-shaped slotted member (not shown) located at the top external surface of the oven and, simultaneously, a V-shaped slotted member 132 (FIG. 2) located at the bottom of the cleaner engages a nib (not shown) projecting from the bottom external surface of the oven, thereby permitting the cleaner to be not only more positively aligned with the jamb but also to secure it from lateral movement during operation of the cleaner. Forward movement of the jamb cleaner is finally stopped when a pair of upper stops 133—133 (FIG. 3) and a pair of lower stops 134—134 (FIG. 4), each of the pairs being located on the front of the cleaner, make full contact with the external surface of the oven thereby indicating that the cleaner is oriented with respect to the jamb.

A latching mechanism (FIG. 5), generally referred to at 135, includes a fluid operated cylinder 136 and piston 137 which is pivotally connected at 138 to a lever 139 pivotally mounted at 140. When the jamb cleaner is in ready position with respect to the jamb, it is positively secured to the oven front by actuating cylinder 136 which causes lever 139 to partially rotate clockwise until lever ends 139a—139a engage and become locked in opposing looped lugs (not shown) extending from the external surface of the oven, thereby not only finally orienting the cleaner with the jamb but also securely locking the cleaner to prevent movement of the cleaner frame during the scraping operation.

As schematically illustrated in FIGS. 15, 16 and 17, the jamb cleaner is shown in varying positions during a scraping cycle. In FIG. 15, it can be assumed that the jamb cleaner is in a start position whereat tube rail carriages 18 and 19 are located approximately along the mid-sections of the jamb side walls, and upper and lower oscillating head mechanisms 55 and 56 are located approximately along the mid-sections of the top and bottom walls, respectively, of the jamb.

As seen in FIG. 16, upon actuation of cylinders 45—45, piston 45a extends to move carriage 18 upwardly which, in turn, drives chain 50 to rotate upper oscillating head mechanism 55 clockwise, thereby permitting the scraper blades associated therewith to scrape the carbon-tar substances from the adjacently disposed top surface of the jamb and the arcuate corner portion contiguous therewith, whereat the scraper units stop when said piston is fully extended. Simultaneously with and similarly to the aforesaid movement, piston 45b retracts and moves carriage 19 downwardly and, in turn, drives chain 52 to rotate lower oscillating head mechanism 56 clockwise, thereby permitting the scraping blades associated therewith to scrape the carbon-tar substances from the adjacently disposed bottom surface of the jamb and the arcuate corner portions contiguous therewith.

As seen in FIG. 17, piston 45a has retracted and piston 45b has extended which, in turn, caused carriages 18, 19 and oscillating head mechanisms 55, 56 to move in the opposite directions to the other ends of their respective jamb surfaces, the scraping units thereon scraping the carbon-tar deposits in their paths. When carriages 18, 19 and oscillating head mechanisms 55, 56 have reached the other ends of their respective paths, the cycle may be repeated to insure removal of all the carbon-tar deposits from the surfaces of the jamb.

I claim:

1. In apparatus for mechanically scraping deposits from the jamb of a coke oven, a linear reciprocating movable scraping mechanism for scraping formed deposits from substantially right angular surfaces of the side walls of the jamb which comprises:
  a frame,
  a pair of carriages cooperatively associated with opposite sides respectively of the frame and extending longitudinally in parallel relationship to each other,
  a pair of longitudinally extending parallel shafts rotarily mounted, one on one of said carriages and the other on the other of said carriages,
  at least one scraper unit attached to each of said shafts and capable of scraping deposits from the substantially right angular surfaces of the respective side wall of the jamb,
  a plurality of resilient torsion means associated respectively with each shaft and biasing it rotarily in one direction to a certain position,
  said scraper units being moved on rotation of said shafts in the opposite direction against the force of said torsion means into position for scraping deposits from the substantially right angular surfaces of the respective side wall of the jamb,
  means for driving the carriages in opposing reciprocating linear paths adjacent respective side walls of the jamb, and
  means carried by said frame for guiding and maintaining the carriages in said linear paths.

2. In apparatus, according to claim 1, wherein each of said scraper units include:
  a blade holder,
  a pair of blades located within and extending from said blade holder in substantially right angular relationship to each other for simultaneously scraping first and second surfaces of the right angular jamb side wall, and
  means for resiliently urging each of the blades outwardly from the holder for contact with said first and second surfaces.

3. In apparatus, according to claim 2, wherein each of said scraper units includes: means for adjustably locating said blades in the blade holder.

4. In apparatus, according to claim 2, which further includes means for transporting the apparatus into position with respect to the jamb and wherein said resilient means torsionally biases the shaft for holding the blade holder in a first position such that one of the blades will initially contact said first surface of the jamb and, upon further movement of the transporting means said other blade will contact said second surface of the jamb, thereby resulting in full contact of the blades with the right angular surfaces of the jamb.

5. In apparatus, according to claim 2, wherein the guiding and maintaining means includes:
  means extending from said frame, and
  a guide roller fixedly located between said extending means for rotational movement about its own axis, said roller having a body portion in contact with a surface of the carriage whose opposing surface is connected to the holding means, said roller guiding the carriage in its reciprocating linear path and maintaining pressure against the blades through the carriage to hold said blades in contact with the jamb surfaces during a scraping thereof.

6. In apparatus, according to claim 5, wherein the carriage is provided with a pair of rails extending longitudinally on opposing surfaces thereof, and said guiding and maintaining means further includes: flange end portions located on said guide roller for engaging respective first surfaces of each rail for providing additional pressure against the blades through the carriage.

7. In apparatus, according to claim 6, wherein said guiding and maintaining means further includes: a pair of cams rotationally connected to said extending means, each of said cams being in contact with respective second surfaces of each rail for facilitating said guiding of the carriage in its reciprocating linear path and for maintaining pressure of the blades against the jamb.

8. In apparatus, according to claim 7, wherein said driving means moves the carriages simultaneously in opposing reciprocating linear paths, the travel of each carriage being a distance slightly longer than the distance between two scraper units thereon, thereby insuring the respective jamb surfaces are scraped during the movement of said carriages.

9. In apparatus for mechanically scraping deposits from the jamb of a coke oven, a scraping mechanism for scraping formed deposits from substantially right angular surfaces of the side walls of the jamb, which comprises:
  a frame,
  a pair of carriages of substantially square configuration cooperatively associated with the frame and extending longitudinally in parallel relationship to each other,
  a plurality of scraper units connected to each carriage, each of said scraper units including a blade holder, a pair of blades located within and extending from said blade holder in substantially right angular relationship to each other for simultaneously scraping first and second surfaces of the right angular jamb side wall, means for resiliently urging each of the blades outwardly from the holder for contact with said first and second surfaces and means for adjustably locating said blades in the blade holder,
  means for transporting the apparatus into position with respect to the jamb,
  a plurality of shafts in axial alignment with each other located on each carriage and connected to each scraper unit for pivotal movement thereof,
  resilient means torsionally biasing the shafts for holding the blade holders in a first position such that one of the blades thereof initially contacts said first surface of the jamb and, upon further movement of the transporting means said other blade thereof contacts said second surface of the jamb, thereby resulting in full contact of the blades with the right angular surfaces of the jamb,
  a pair of rails extending longitudinally on opposing surfaces of each carriage,
  means extending from said frame,
  a guide roller fixedly located between said extending means for rotational movement about its own axis, said roller having a body portion in contact with a surface opposite to the surface for holding the scraper units and flange end portions for engaging respective first surfaces of each rail, said roller guiding the carriage in its reciprocating linear path and maintaining pressure against the scraper units through the carriage to hold said blades in contact with the jamb surfaces during a scraping thereof,
  a pair of auxiliary cams connected to said extending means, each of said cams being in contact with respective second surfaces of each rail for assisting said guide roller, and
  means for driving the carriages simultaneously in opposing reciprocating linear paths, the travel of each carriage being a distance slightly longer than the distance between the scraper units thereon, thereby insuring that the respective jamb surfaces are scraped during the movement of said carriages.

References Cited

UNITED STATES PATENTS

| 3,526,013 | 9/1970 | Kato | 15—93 A |
|---|---|---|---|
| 3,146,475 | 9/1964 | Balitsky et al. | 15—93 A X |
| 3,056,699 | 10/1962 | Randell et al. | 15—93 A X |

FOREIGN PATENTS 867,761   5/1961   Great Britain _____ 202—241

NORMAN YUDKOFF, Primary Examiner

D. EDWARDS, Assistant Examiner

U.S. Cl. X.R.

15—93 A; 202—248